United States Patent [19]

Lintz et al.

[11] Patent Number: 5,145,811

[45] Date of Patent: Sep. 8, 1992

[54] INORGANIC CERAMIC PAPERS

[75] Inventors: Timothy S. Lintz, Grand Island, N.Y.; Julie A. Golebiewski, Farmington,, Mich.

[73] Assignee: The Carborundum Company, Cleveland, Ohio

[21] Appl. No.: 727,715

[22] Filed: Jul. 10, 1991

[51] Int. Cl.$^5$ .............. C03C 13/00; C03C 13/06; C04B 35/02; C04B 35/08

[52] U.S. Cl. .................. 501/95; 501/35; 501/36; 501/94; 501/100; 501/102; 501/106

[58] Field of Search .............. 501/36, 94, 95; 106/38.27, 286.1, 286.8, 38.9, 711; 428/113, 212, 325, 332, 688, 923

[56] References Cited

U.S. PATENT DOCUMENTS

| | | | |
|---|---|---|---|
| 3,077,413 | 2/1963 | Campbell | 106/38.9 |
| 3,510,394 | 5/1970 | Cadotte | 162/145 |
| 3,629,116 | 12/1971 | Gartner et al. | 252/62 |
| 3,779,862 | 12/1973 | Bomberger | 162/152 |
| 4,116,761 | 9/1978 | Head | 162/152 |
| 4,174,331 | 11/1979 | Myles | 260/29.1 R |
| 4,269,887 | 5/1981 | Sonobe et al. | 428/280 |
| 4,339,540 | 7/1982 | Beall et al. | 501/3 |
| 4,381,970 | 5/1983 | Craig et al. | 162/152 |
| 4,389,282 | 6/1983 | Yonushonis et al. | 162/145 |
| 4,702,804 | 10/1987 | Mazur et al. | 204/73 |
| 4,806,206 | 2/1989 | Kamijo et al. | 162/145 |
| 4,835,074 | 5/1989 | Bolster et al. | 429/43 |
| 4,908,198 | 3/1990 | Weinberg | 423/415 |
| 4,912,067 | 3/1990 | Garman | 501/32 |
| 5,053,362 | 10/1991 | Chi et al. | 501/95 |

Primary Examiner—Mark L. Bell
Assistant Examiner—Michael A. Marcheschi
Attorney, Agent, or Firm—Michael F. Esposito; Larry W. Evans

[57] ABSTRACT

Improved inorganic ceramic papers comprising heterogeneous grades of ceramic fibers, namely small, high surface area fibers and at least one larger, lower surface area ceramic fiber are bonded into a matrix with the aid of an inorganic binder system having at least one metal oxide with an average particle size below 200 nm. Multiple different grades of inorganic ceramic fibers and small particle size inorganic binders impart good tensile strength and flexibility characteristics in the same sheet.

30 Claims, No Drawings

INORGANIC CERAMIC PAPERS

BACKGROUND OF THE INVENTION

The present invention relates generally to ceramic paper and methods of manufacture, and more specifically, to novel inorganic type ceramic papers having both high strength and good flexibility properties.

Ceramic paper generally refers to sheet products having thicknesses up to ¼ inch made from and predominantly comprising ceramic fibers. Such papers find wide usage in smaller household appliances as heating element insulation, and also have many industrial uses, such as refractory applications.

In meeting specifications for such applications ceramic paper should be both flexible and strong. Desired minimum standards for tensile strength are at least 1000 gram load/inch with preferably 1500 gram load/inch as determined by TAPPI test method ASTM T404, and flexibility as measured by TAPPI folding endurance test method ASTM T423 which should provide a minimum of 150 fold cycles. In addition, ceramic papers should be resistant to thermal shock to avoid disintegration and flaking apart from heat.

Heretofore, ceramic papers relied principally on latex, polyvinyl acetate and phenolic resin type organic binders for achieving needed tensile strength properties. However, upon exposure to high temperatures these organic binders would frequently burn out causing outgasing and a loss in tensile strength. In an effort to overcome this problem, one alternative which had been tried was the production of an inorganic sheet without organic binders. However, virtually all attempts to prepare inorganic ceramic papers have so far proven unsuccessful in one way or another. Some attempts yielded very weak products, e.g. burn grade papers, while others resulted in formulating papers with limited flexibility. Hence, while substantial effort has been made to prepare papers with both high tensile strength and flexibility, heretofore retaining both properties in the same inorganic ceramic paper at commercially acceptable levels i.e. minimum flexibility of at least 1.75 percent elongation as measured by ASTM T423 and a tensile strength of at least 1000 grams/inch as measured by ASTM T404, has not been achieved.

Accordingly, it would be highly desirable to have inorganic ceramic papers which are both flexible and strong, and free of organic binders and the disadvantages associated therewith.

SUMMARY OF THE INVENTION

It is therefore a principal object of the invention to provide for ceramic papers which possess both the required strength (tensile) and flexibility characteristics prior to firing. Such improved papers have uses not only as supports for heating elements in appliances, but also expanded applications as refractories in heat treating furnaces, back up linings in quartz semiconductor furnaces, casting tips in rolling sheet aluminum, heat shields for batteries and defense applications, induction furnace coil wraps, transfer tubes for casting in the production of aluminum and steel, pipe liners, to name but a few.

It is yet a further object of the invention to provide ceramic papers free of burnable organic binders, and which are not only strong and flexible to permit shaping and molding prior to firing, but which upon firing rigidize into shapes formed prior to firing with compression strengths remaining high at all temperature ranges. The present invention also provides for inorganic papers which remain strong without disintegrating or flaking even when converted from flexible products to rigid ones by the application of heat.

It is yet a further object of the invention to provide for novel inorganic ceramic papers which have eliminated all organics making them especially adaptable for commercial applications where gas and smoke generation cannot be tolerated, such as in appliacances like toasters and coffee makers.

The foregoing objects and advantages are achieved with ceramic papers comprising inorganic ceramic fibers and a system of inorganic binders for bonding the fibers into coherent sheet materials. The inorganic ceramic papers comprise an inorganic binder system having at least one metal oxide with an average particle size in the range of about 7 to about 200 nm, and a mixture of heterogeneous grades of inorganic ceramic fibers. The fiber mixture requires at least one high surface area (HSA) inorganic ceramic fiber and at least one larger, lower surface area ceramic fiber. The HSA fibers and sufficient larger, lower surface area fibers when bonded into a fiber matrix with the foregoing inorganic binder system provides a ceramic paper with a minimum flexibility of at least 1.75 percent elongation as measured by ASTM T423 and also a minimum strength of at least 1000, preferably 1500 grams/inch as measured by ASTM T404, when the paper is at least 0.025 inches thick, and more particularly, from about 0.025 to about 0.140 inches in thickness.

In achieving the above objectives the present invention contemplates as a further preferred embodiment, inorganic ceramic papers comprising a ceramic fiber mixture of (a) HSA inorganic ceramic fibers, (b) inorganic ceramic fibers of intermediate surfaces area and (c) longer, lower surface area inorganic ceramic fibers than the fibers of (b).

Also intended within the framework of the stated objectives are ceramic papers comprising from about 3 to about 20 weight percent of the inorganic binder system having at least one metal oxide with an average particle size ranging from about 7 to about 200 nm and a mixture of heterogeneous grades of inorganic ceramic fibers comprising:

(a) from about 3 to about 25 weight percent of high surface area fibers having lengths ranging from about 50 to about 250μ and a diameter distribution ranging from about 0.10 to 2.00μ, preferably about 0.10 to about 1.50μ;

(b) from about 60 to about 90 weight percent of intermediate surface area fibers having lengths ranging from about 100 to about 500μ and a diameter distribution ranging from about 0.50 to about 10.0μ, and (c) from 0 to about 25 weight percent of long, low surface area fibers having lengths ranging from about 0.25 to about 3.0 inches and a diameter distribution ranging from about 2.0 to about 15μ.

The objects and advantages of the invention as recited hereinabove are also achieved with an inorganic fiber floc which comprises an aqueous slurry of fibers and an inorganic binder system which preferably includes a colloidal dispersion of at least one metal oxide. The fibers preferably comprise:

(a) from about 3 to about 25 weight percent of high surface area fibers having lengths ranging from about 50 to about 250μ and a diameter distribution ranging from about 0.10 to about 1.50μ;

(b) from about 60 to about 90 weight percent of intermediate surface area fibers having lengths ranging from about 100 to about 500μ and a diameter distribution ranging from about 0.50 to about 10.0μ, and (c) from 0 to about 25 weight percent of long, low surface area fibers having lengths ranging from about 0.25 to about 3.0 inches and a diameter distribution ranging from about 2.0 to about 15μ.

The invention also contemplates novel methods for making the improved ceramic papers by the steps of:

(I) providing a mixture of heterogeneous grades of inorganic ceramic fibers comprising:

(a) high surface area fibers having lengths ranging from about 50 to about 250μ and a diameter distribution ranging from about 0.10 to about 1.50μ, (b) intermediate surface area fibers having lengths ranging from about 100 to about 500μ and a diameter distribution ranging from about 0.50 to about 10.0μ, and (c) long, low surface area fibers having lengths ranging from about 0.25 to about 3.0 inches and a diameter distribution ranging from about 2.0 to about 15μ, the relative proportions of fibers (a–c) present in the mixture are sufficient to impart a minimum flexibility to the paper when dried of at least 1.75 percent elongation as measured by ASTM T423 and a minimum strength of at least 1000, preferably 1500 grams/inch as measured by ASTM T404 when the paper is from about 0.025 to about 0.140 inches in thickness;

(II) forming an aqueous slurry of the fibers;

(III) mixing the aqueous slurry of step (II) with an inorganic binder system having at least one metal oxide;

(IV) casting the slurry onto a paper making screen to form a paper web, and (V) dewatering and drying the paper web.

DETAILED DESCRIPTION OF THE INVENTION

Unless otherwise stated, all mix component percentages are weight percentages based on total formulation solids.

Preferably, inorganic ceramic papers disclosed herein prior to firing have tensile stengths of at least 1000, preferably 1500 gram load/inch width and flexibilities of at least 1.75 percent elongation. Both high strength and flexibility in the same paper are achieved with a multiplicity of different or heterogeneous grades of inorganic ceramic fibers bonded into a matrix with an inorganic binder system. High surface area (HSA) type ceramic fibers in an amount ranging from about 3 to about 25 percent are primarily responsible for imparting strength characteristics to the ceramic paper. However, the HSA fibers are also important in retaining the inorganic binder during manufacturing. For purposes of this invention, the expression "HSA fibers" or "high surface area fibers" is intended to mean inorganic ceramic fibers having dimensions ranging from about 50 to about 250μ in length, and a diameter distribution from about 0.10 to about 1.50μ.

The term "heterogeneous" as used herein is intended to refer to ceramic fibers belonging to different average size categories but distribution can overlap. In addition, the compositional make-up may be the same or different. Thus, a ceramic paper may have vitreous aluminosilicate HSA fibers and vitreous aluminosilicate fibers of intermediate surface area. Nothwithstanding, each group of fibers belong to a different size category.

To achieve the desired balance in physical properties, and particularly, flexibility characteristics with the tensile strength as defined herein the ceramic papers also include "larger, lower surface area fibers" which expression in intended to include inter-alia fibers of intermediate surface area and long, low surface area fibers. For purposes of this invention expressions like "fibers of intermediate surface area" or "intermediate surface area fibers" are intended to mean inorganic ceramic fibers with dimensions in the range of about 100 to about 500μ in length and a diameter distribution from about 0.50 to about 10.0μ. The fibers of intermediate surface area are significant because they provide body to the paper by functioning as a link between the smaller, HSA fibers and the long, low surface area fibers forming the paper matrix.

The expression "long, low surface ceramic fibers" as used herein is intended to mean dimensionally larger inorganic ceramic fibers compared with "intermediate surface area fibers" having a range of about 0.25 to about 3.0 inches in length and a diameter distribution from about 2.0 to about 15μ. This grade of ceramic fiber is primarily responsible for imparting additional desired flexibility properties to the paper.

The inorganic ceramic papers generally contain from about 3 to about 25 percent HSA fibers, and also from about 60 to about 90 percent fibers of intermediate surface area. While the present invention contemplates embodiments which may be free of long, low surface area fibers, i.e., 0 to 25 percent, from about 5 to about 20 percent of the long, low surface area fibers are preferred for optimal flexibility characteristics.

The inorganic fibers for the papers disclosed herein, may be prepared from ceramic types made from alumina and silica, such as vitreous aluminosilicate. Alternative useful ceramic fibers include mineral wool fibers, fiberglass, zirconia fibers, zirconia tow, and mixtures of the same. It will be understood that these are representative examples only, and that other high and larger, lower surface area ceramic fibers meeting the foregoing dimensional criteria may also be employed in the papers. However, aluminosilicate fibers are most preferred.

Specific representative examples of useful vitreous aluminosilicate fibers which are also commercially available through ordinary channels of commerce are those marketed under the registered trademark Fiberfrax ® aluminosilicate fibers from The Carborundum Company, Fibers Division, Niagara Falls, N.Y. Fiberfrax ® HSA grade bulk fibers have a sufficiently small diameter and short length to retain the small particles of the inorganic binder system which otherwise would be lost in manufacturing. They are also capable of imparting the desired stength characteristics to the paper sheet.

The larger, lower surface area inorganic ceramic fibers, including fibers of intermediate surface area and the long, low surface area fibers are also commercially available under the Fiberfrax ® trademark. Preferred grades of vitreous aluminosilicate fibers of intermediate surface area include those commercially available under the Fiberfrax ® "7000" designation; including Regular; washed; long stable; etc. Other ceramic fibers of long fiber length, such as polycrystalline, high alumina, mullite fiber available under the trademark Fibermax ® may be employed with or in place of Fiberfrax ® 7000, for example, to increase high temperature applications.

A representative example of the long, low surface area type ceramic fibers would be the spun bulk type fibers, such as those commercially available under the Fiberfrax ®, Spun Fiber designation which is composed of extra long alumina-silica fibers.

The intermediate surface area fibers preferably have a fiber index (FI) ranging generally from about 65 to about 80 percent fiber (20 to 35 percent shot). It has been found that tensile stength of the ceramic paper may be sacrificed with fiber indices below 65 percent due to higher levels of shot.

The binder system for the ceramic fiber mixture comprises at least one metal oxide with an average particle size in the range from about 7 to about 200 nm. Generally, the inorganic ceramic papers contain from about 3 to about 20 percent of the inorganic binder, and more preferably, from about 3 to about 10 percent. Preferred binders include such metal oxides as alumina, zirconia, silica, fumed silica and mixtures of the same. Some generally preferred binders include those available as colloidal dispersions of metal oxides, like colloidal alumina, colloidal silica, colloidal zirconia, and the like. Representative examples of commercially available colloidal dispersions of metal oxides suitable for use in the manufacture of the ceramic papers include those available from Nyacol Products, Inc., Ashland, Mass. under the trademark Nyacol AL20 a colloidal dispersion of alumina; Nyacol $ZrO_2$ 10/20 which is a colloidal dispersion of zirconia containing 20 percent solids, an average particle size of 10 nm with a particle size distribution ranging about 7 to 30 nm. Others include colloidal dispersions of silica containing 40 percent silica solids with an average particle size distribution of 12 nm available from E. I. Dupont under the trademark Ludox.

The selection of a particular binder or combinations of binders can result in variations in products flexibility. Colloidal alumina is particularly desirable in the inorganic ceramic papers disclosed herein because it provides a high temperature continuous use limit and more pliable properties are imparted to the sheet when dried. Optimum levels and binder combinations can be ascertained through exercise of ordinary skills. For instance, small amounts of colloidal silica can be employed in the dried inorganic papers for purposes of improving the abrasion resistance of the paper by replacing from about 1.0 to about 3.0 percent of the colloidal alumina in the furnish with collidal silica. Under these circumstances the colloidal silica functions in the capacity as a surface rigidizing agent to prevent a dried web from undergoing a surface peeling effect.

While not wishing to be held to any specific mechanism of action for achieving both good flexibility and high tensile stength it is believed that the high surface area ceramic fibers are effective in mechanically trapping the colloidal particles of the binder system through some type of surface area phenomena. Evidence of this is found in the fact that when fibers other than high surface area type are used and HSA fibers are omitted, paper sheets become rigid and weak. Hence, the high surface area ceramic fibers in combination with the binder system disclosed herein are critical components in producing inorganic ceramic papers with outstanding tensile strength characteristics without adversely affecting green strength flexibility.

In addition, it has been observed that as the average particle size of the binder exceeds the range of approximately 7 to about 200 nm a fall off in tensile strength occurs. Thus, the high tensile strength of the ceramic papers may also be attributed to the inorganic binder system by maintaining an upper limit on average particle size of the metal oxides employed.

Properties of the papers can be further modified to meet specific end use applications. For instance, alum may be optionally added to the slurry to impart more rigidity to the paper sheets. Generally, alum can be added in a sufficient amount to increase rigidity which is normally an amount to lower the pH of the slurry to about 4.0 to about 4.2. Greater or lesser amounts can be employed depending on the flexibility properties desired.

The inorganic ceramic papers may be prepared by methods which include the steps of forming an aqueous blend of the HSA and larger, lower surface area fibers.

Sheet products are formed by vacuum casting the slurry with conventional paper making equipment to form a wet web. The webs are dried in ovens typically at 200° to 600° F.

The following specific examples demonstrate the various aspects of this invention, however, it is to be understood that these examples are for illustrative purposes only and do not purport to be wholly definitive as to conditions and scope.

EXAMPLE I (Comparative)

To demonstrate the manufacture of a completely inorganic ceramic paper and its properties the following formulation was prepared for a production run on a commercial scale papermaking machine:

| Materials | Weight % |
|---|---|
| Fiberfrax ® 7000M* (Fiber index 70%) | 88 |
| Nyacol AL-20** | 8 |
| Alum | 3 |
| Nalco 7530*** | 1 |

*A modified vitreous aluminosilicate fiber available from The Carborundum Company, Fibers Division, Niagara Falls, N.Y.
**A colloid of alumina in water having 20% solids from Nyacol Products, Ashland, MA.
***An acrylamide modified cationic copolymer from Nalco Chemical Naperville, Ill.

The above formulation was prepared by forming an aqueous slurry of the ceramic fibers by mixing the fibers and other constituents in water. The colloidal alumina binder was added to the slurry and mixed.

Alum was added to a pH of 4.1 to 4.3, followed by the addition of Nalco 7530.

Using the above formulation, the run was conducted using a standard paper making machine. The ceramic paper was rolled by hand off the machine onto a PVC core.

In testing the materials for tensile strength square foot samples were cut from both edges and the middle of the web at the rolls tested had the following properties:

TABLE 1

| Sample/ Roll | Tensile Strength (gm/in.) South-Middle-North | | | Thickness Inches | Flexibility % Elongation |
|---|---|---|---|---|---|
| #1 | 500 | 300 | 300 | 0.077 | checked |
| #2 | 300 | — | — | 0.101 | " |
| #3 | 400 | — | — | 0.138 | " |
| #6 | 463 | 514 | — | 0.130 | " |
| #11 | 300 | 400 | 300 | 0.131 | " | without high surface area fibers. Binder retention was low, as was tensile strength. Checking or surface cracking was observed which was a manifestation of low flexibility/elongation.

EXAMPLE II (Comparative)

A ceramic paper having the same formulation as set forth in Example 1 was prepared by the method of Example 1 except that the paper was compression rolled prior to rolling onto the PVC core.

The resulting paper had the following properties:

TABLE 2

| Sample/Roll | Tensile Strength (gm/in.) South-Middle-North | | | Thickness Inches | Flexibility % Elongation |
|---|---|---|---|---|---|
| #1 | 200 | 100 | 100 | 0.121 | no checking |
| #1 | 500 | 400 | 100 | 0.123 | " |
| #1 | 400 | 100 | — | 0.125 | " |
| #3 | 600 | 700 | 451 | 0.125 | " |
| #4 | 1100 | 1018 | 1200 | 0.123 | " |
| #15 | 387 | 632 | 565 | 0.140 | " |

Table 2 shows that compression of the material will improve flexibility. None of the samples, which were again rolled by hand, exhibited checking as in Example I. While some tensile strengths were in the 1000 to 1200 grams/inch range they were still below the preferred 1500 grams/inch minimum.

EXAMPLE III

A further run was conducted to improve retention of inorganic binder and to reduce surface softness of the sheet materials.

A floc was prepared by the method of Example I with the following formulation:

| Materials | Weight % |
|---|---|
| Fiberfrax ® 7000M* (Fiber index 70%) | 85 |
| Fiberfrax ® HSA-HP* | 3–3.5 |
| Nyacol AL-20** | 2.5 |
| Ludox HS-40** | 6 |
| Alum | 2.5 |
| Nalco 7530 | .5 |

Sheets were prepared on the paper making machine and tested for tensile strength and flexibility. The results are shown in Table 3 below:

TABLE 3

| Sample/Roll | Tensile Strength (gm/in.) South-Middle-North | | | Thickness Inches | Flexibility % Elongation |
|---|---|---|---|---|---|
| "J" GRADE (0.105 inch thick min.) | | | | | |
| #1 | 1600 | 1300 | 2300 | 0.127 | 1.75 |
| #8 | 3100 | 2400 | 3800 | 0.115 | 1.75 |
| #12 | 900 | 1000 | 900 | 0.108 | 1.30 |
| "F" GRADE (0.065 inch thick min.) | | | | | |
| #1 | 2100 | 2500 | 1700 | 0.075 | 1.75 |
| #7 | 1700 | 3000 | 2800 | 0.077 | 1.75 |
| — | 2600 | 2800 | 2000 | 0.070 | 1.75 |
| "A" GRADE (0.025 inch thick min.) | | | | | |
| #1 | 472 | 544 | 742 | 0.048 | 0.60 |

Table 3 demonstrates the importance of high surface area fibers for improved strength from better binder retention, particularly in preparing thicker grade papers e.g. J and F grades. The HSA fibers in combination with at least one larger, lower surface area fiber and inorganic binders provided at least minimum targeted tensile strength and flexibility objectives in the same sheet materials for these thicker grades.

EXAMPLE IV

In order to demonstrate the benefits of adding larger, lower surface area fibers ceramic paper samples were prepared from the following formulation:

| Materials | Weight % |
|---|---|
| Fiberfrax ® 7000M* Fiber | 85 |
| Fiberfrax ® 6010T Spun Fiber* | 5 |
| Fiberfrax ® HSA-HP Fiber | 3 |
| Nyacol AL-20 Colloid | 2.5 |
| Ludox HS-40 Colloid | 3 |
| Alum** | |

*Long, low surface area vitreous aluminosilicate fibers available from Fibers Div., The Carborundum Co.
**Not measured.

Sheets with the above formulation were prepared according to the procedure set forth in Example II except that Alum was added continuously to maintain pH at 4.6. Table 4 below shows the properties of the ceramic paper produced in this trial.

TABLE 4

| Sample/Roll | Tensile Strength (gm/in.) South-Middle-North | | | Thickness Inches | Flexibility % Elongation |
|---|---|---|---|---|---|
| #1 | 800 | — | — | 0.131 | 2.0–2.1 |
| #1 | 1300 | — | — | 0.130 | " |
| #1 | 1100 | 1300 | 1000 | 0.123 | " |
| #2 | 1800 | 2900 | 2000 | 0.117 | " |
| #2 | 1900 | — | — | 0.131 | " |
| #2 | 1700 | 1500 | 1500 | 0.134 | " |
| #3 | 1000 | 900 | 1000 | 0.163 | " |

Table 4 shows an improvement in flexibility and tensile strength which enabled the paper to be rolled into rolls without checking. The lower tensile strength data shown for Roll #1 is manifestation of start up which is normal. Similarly, the lower tensile strength for Roll #3 was the result of shut down.

EXAMPLE V

An inorganic paper is prepared with the following formulation:

| Material | Grams | Percent Solids |
|---|---|---|
| Water | 3 L | — |
| Fiberfrax HSA | 1.20 | 13.7 |
| Fiberfrax 7000M | 4.80 | 54.3 |
| Nyacol AL-20 Colloidal alumina | 10.00 | 22.5 |
| Alum (40 lbs/ton) | 2.0 ml | 9.0 |
| Nalco 7530 (20 lbs/ton) | 4 ml | 0.5 |

The above formulation is prepared by first measuring out the water which has a temperature of about 30° C. The pH is adjusted to 6.75 using NaOH or HCl. One liter of the water is taken from the 3 liters and placed in a blender. The larger low surface area ceramic fibers and the HSA ceramic fibers are added to the water in the blender. The slurry of water and fibers is blended on the low/mix mode for 45 seconds and returned to the remaining 2 liters of water where it is mixed for 2 minutes using a lightening stirrer. The colloidal alumina (at 20 percent solids) is added to the slurry and mixed for 30 seconds. The alum is then added to the slurry and mixed for 30 seconds. The Nalco 7530 is added to the slurry as a flocculant/drainage aid. The slurry is then vacuum cast in a conventional paper handsheet mold, pressed on a standard 6 inch diameter manual hydraulic press at a guage reading of 1500 (equals 5890 psi), and dried in an oven at 120° C.

While the invention has been described in conjunction with specific examples thereof, this is illustrative only. Accordingly, many alternatives, modifications and variations will be apparent to persons skilled in the art in light of the foregoing description, and it is therefore intended to embrace all such alternatives, modifications and variations as to fall within the spirit and broad scope of the appended claims.

What we claim is:

1. An inorganic ceramic paper comprising an inorganic binder system having at least one metal oxide with an average particle size in a range from about 7 to about 200 nm and a mixture of heterogeneous grades of inorganic ceramic fibers comprising high surface area fibers having lengths ranging from about 50 to 250µ and a diameter distribution ranging from about 0.10 to about 2.00µ, and at least one grade of larger, lower surface area fibers having lengths ranging from about 100µ to about 3.0 inches and a diameter distribution ranging from about 0.50 to about 15.0µ, the relative proportions of said fibers in said mixture being sufficient to impart a minimum flexibility of at least 1.75 percent elongation and a minimum strength of at least 1000 grams/inch when said paper is from about 0.025 to about 0.140 inches in thickness.

2. The inorganic ceramic paper of claim 1 wherein the larger, lower surface area inorganic ceramic fibers are a mixture of fibers of intermediate surface area and long, low surface area fibers.

3. The inorganic ceramic paper of claim 2 wherein the high surface area inorganic ceramic fibers have lengths ranging from about 50 to about 250µ and a diameter distribution ranging from about 0.10 to about 1.50µ; said intermediate surface area ceramic fibers have lengths ranging from about 100 to about 500µ and a diameter distribution ranging from about 0.50 to about 10.0µ, and the long, low surface area fibers have lengths ranging from about 0.25 to about 3.0 inches and a diameter distribution ranging from about 2.0 to about 15µ.

4. The inorganic ceramic paper of claim 1 wherein said inorganic binder is a member selected from the group consisting of colloidal alumina, colloidal silica, fumed silica, colloidal zirconia and mixtures thereof.

5. The inorganic ceramic paper of claim 3 wherein said inorganic binder is a member selected from the group consisting of colloidal alumina, colloidal silica, colloidal zirconia, fumed silica and mixtures thereof.

6. The inorganic ceramic paper of claim 4 wherein said ceramic fibers are selected from the group consisting of aluminosilicate, mineral wool, fiberglass, zirconia, zirconia tow and mixtures thereof.

7. The inorganic ceramic paper of claim 1 wherein said high surface area ceramic fibers are prepared from alumina and silica.

8. The inorganic ceramic paper of claim 1 wherein the high surface area ceramic fibers comprise vitreous aluminosilicate.

9. The inorganic ceramic paper of claim 2 wherein the long, low surface area fibers are aluminosilicate spun fibers.

10. The ceramic paper of claim 2 wherein the binder includes a sufficient amount of colloidal silica to increase rigidity.

11. The ceramic paper of claim 2 including a sufficient amount of alum to increase rigidity.

12. An inorganic ceramic paper comprising from about 3 to about 20 weight percent of an inorganic binder system comprising at least one metal oxide with an average particle size ranging from about 7 to about 200 nm and a mixture of heterogeneous grades of inorganic ceramic fibers comprising:
    (a) from about 3 to about 25 weight percent of high surface area fibers having lengths ranging from about 50 to about 250µ and a diameter distribution ranging from about 0.10 to about 1.50µ;
    (b) from about 60 to about 90 weight percent of intermediate surface area fibers having lengths ranging from about 100 to about 500µ and a diameter distribution ranging from about 0.50 to about 10.0µ; and
    (c) from 0 to about 25 weight percent of long, low surface area fibers having lengths ranging from about 0.25 to about 3.0 inches and a diameter distribution ranging from about 2.0 to about 15µ.

13. The inorganic ceramic paper of claim 12 wherein the quantities of fibers (a-c) in said mixture are sufficient to impart a minimum flexibility of at least 1.75 percent elongation and a minimum strength of at least 1000 grams/inch when said paper is from about 0.025 to about 0.140 inches in thickness.

14. The inorganic ceramic paper of claim 12 wherein the inorganic binder system is in the form of a colloidal dispersion comprising a metal oxide selected from the group consisting of alumina, silica, zirconia and mixtures thereof.

15. The inorganic ceramic paper of claim 13 wherein the long, low surface area ceramic fibers are present in an amount from about 5 to about 20 weight percent.

16. The inorganic ceramic paper of claim 12 wherein the ceramic fibers are selected from the group consisting of aluminosilicate, mineral wool, fiberglass, zirconia, zirconia tow and mixtures thereof.

17. An inorganic fiber floc comprising an aqueous slurry of ceramic fibers and an inorganic binder system comprising at least one metal oxide, said fibers comprising a mixture of:
    (a) from about 3 to about 25 weight percent of high surface area fibers having lengths ranging from about 50 to about 250µ and a diameter distribution ranging from about 0.10 to about 1.50µ;
    (b) from about 60 to about 90 weight percent of intermediate surface area fibers having lengths ranging from about 100 to about 500µ and a diameter distribution ranging from about 0.50 to about 10.0µ; and
    (c) from 0 to about 25 weight percent of long, low surface area fibers having lengths ranging from about 0.25 to about 3.0 inches and a diameter distribution ranging from about 2.0 to about 15µ.

18. The inorganic fiber floc of claim 17 wherein the relative proportions of fibers (a-c) present in said mixture are sufficient to impart a minimum flexibility to said paper when dried of at least 1.75 percent elongation and a minimum strength of at least 1000 grams/inch when the said paper is from about 0.025 to about 0.140 inches in thickness.

19. The inorganic fiber floc of claim 17 wherein said inorganic fiber mixture comprises fibers selected from the group consisting of aluminosilicate, mineral wool, fiberglass, zirconia, zirconia tow and mixtures thereof.

20. The inorganic fiber floc of claim 17 including a sufficient amount of alum to increase the rigidity of said floc when formed into a sheet of ceramic paper and dried.

21. The inorganic fiber floc of claim 17 including a retention/drainage aid material.

22. The inorganic fiber floc of claim 17 wherein at least one of said fibers is comprised of vitreous aluminosilicate.

23. The inorganic fiber floc of claim 17 wherein the fiber mixture comprises long, low surface area ceramic fibers in an amount from about 5 to about 20 weight percent.

24. The inorganic fiber floc of claim 17 wherein the metal oxide of the binder is a member selected from the group consisting of alumina, silica, zirconia, fumed silica and mixtures thereof.

25. A method of making an inorganic ceramic paper which comprises the steps of:
(I) providing a mixture of heterogeneous grades of inorganic ceramic fibers comprising:
(a) high surface area fibers having lengths ranging from about 50 to about 250µ and a diameter distribution ranging from about 0.10 to about 1.50µ;
(b) intermediate surface area fibers having lengths ranging from about 100 to about 500µ and a diameter distribution ranging from about 0.50 to about 10.0µ; and
(c) long, low surface area fibers having lengths ranging from about 0.25 to about 3.0 inches and a diameter distribution ranging from about 2.0 to about 15µ,
the relative proportions of fibers (a–c) present in said mixture being sufficient to impart a minimum flexibility to said paper when dried of at least 1.75 percent elongation and a minimum strength of at least 1000 grams/inch when the said paper is from about 0.025 to about 0.140 inches in thickness;
(II) mixing said fibers with water to form an aqueous slurry of said fibers;
(III) mixing the aqueous slurry of step (II) with an inorganic binder system having at least one metal oxide;
(IV) casting said slurry onto a paper making screen to form a paper web, and
(V) dewatering and drying said paper web.

26. The method of claim 25 wherein said (a) ceramic fibers are present in a range from about 3 to about 25 weight percent; said (b) ceramic fibers are present in a range from about 60 to about 90 weight percent, and said (c) ceramic fibers are present in a range from 0 to about 25 weight percent.

27. The method of claim 25 including the step of mixing a sufficient amount of alum with said slurry to reduce flexibility of said sheet after drying.

28. The method of claim 25 including the step of incorporating a sufficient amount of a retention/drainage aid material into said slurry to enhance removal of water from said paper web.

29. The method of claim 25 including the step of compressing the dried paper sheet to enhance flexibility to enable said paper to be rolled.

30. The method of claim 25 wherein said inorganic binder is selected from the group consisting of colloidal alumina, colloidal silica, colloidal zirconia, fumed silica and mixtures thereof.

* * * * *